(12) United States Patent
Peters et al.

(10) Patent No.: US 9,156,329 B2
(45) Date of Patent: Oct. 13, 2015

(54) LIGHT WEIGHT TUBULAR TWIST BEAM

(71) Applicants: Christopher Erik Peters, Guelph (CA); William Keith Comer, Paris (CA)

(72) Inventors: Christopher Erik Peters, Guelph (CA); William Keith Comer, Paris (CA)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 14/407,530

(22) PCT Filed: Jun. 13, 2013

(86) PCT No.: PCT/CA2013/000571
§ 371 (c)(1),
(2) Date: Dec. 12, 2014

(87) PCT Pub. No.: WO2013/185217
PCT Pub. Date: Dec. 19, 2013

(65) Prior Publication Data
US 2015/0115564 A1 Apr. 30, 2015

Related U.S. Application Data

(60) Provisional application No. 61/660,151, filed on Jun. 15, 2012.

(51) Int. Cl.
*B60G 11/18* (2006.01)
*B60G 21/05* (2006.01)
*B60B 35/02* (2006.01)
*B21D 47/01* (2006.01)
*B21D 53/88* (2006.01)

(52) U.S. Cl.
CPC ............. *B60G 21/051* (2013.01); *B21D 47/01* (2013.01); *B21D 53/88* (2013.01); *B60B 35/02* (2013.01); *B60B 2310/211* (2013.01); *B60G 2200/21* (2013.01); *B60G 2200/23* (2013.01); *B60G 2202/136* (2013.01); *B60G 2204/1226* (2013.01); *B60G 2206/012* (2013.01); *B60G 2206/014* (2013.01); *B60G 2206/202* (2013.01); *B60G 2206/427* (2013.01); *B60G 2206/8102* (2013.01); *B60G 2206/8103* (2013.01)

(58) Field of Classification Search
CPC   B60B 35/02; B60B 2310/211; B60G 21/051; B60G 2200/21; B60G 2206/8103; B60G 2204/1226; B60G 2206/014; B60G 2206/202; B60G 2202/136; B60G 2206/427
See application file for complete search history.

(56) References Cited

U.S. PATENT DOCUMENTS 6,145,271 A    11/2000 Kössmeier et al.
6,510,763 B1 *  1/2003 Streubel et al. ................. 74/588

(Continued)

FOREIGN PATENT DOCUMENTS

DE  102010045919 A1 *  3/2012  ........... B60G 21/051
EP     0752332 A1     1/1997
EP     2028029 A2     2/2009
FR     2964909 A1     3/2012

*Primary Examiner* — Faye M Fleming
(74) *Attorney, Agent, or Firm* — Dickinson Wright PLLC

(57) ABSTRACT

A tubular twist beam comprises a tubular body 20 including a U-shaped groove 22, tubular end sections 28, and transition sections 26 therebetween. The width w of the U-shaped groove 22 decreases continuously from each transition section 26 to a center point C of the tubular body 20 and is narrowest at the center point C to shift stress from the transition sections 26 to an area around the center point C. The tubular body 20 also includes depressions 24 along side walls 38 of each transition section 26 to direct stress to the underside of the U-shaped groove 22 and further balance the stress levels along the length of the tubular body 20. Thus, the tubular body 20 can be formed with a reduced thickness t and thus a reduced weight without sacrificing performance.

20 Claims, 5 Drawing Sheets

(56) References Cited

U.S. PATENT DOCUMENTS

| | | | |
|---|---|---|---|
| 8,205,898 B2 * | 6/2012 | Toepker | 280/124.106 |
| 2009/0020974 A1 * | 1/2009 | Lee | 280/124.107 |
| 2010/0009114 A1 * | 1/2010 | Kim | 428/99 |
| 2010/0301577 A1 | 12/2010 | Toepker | |

* cited by examiner

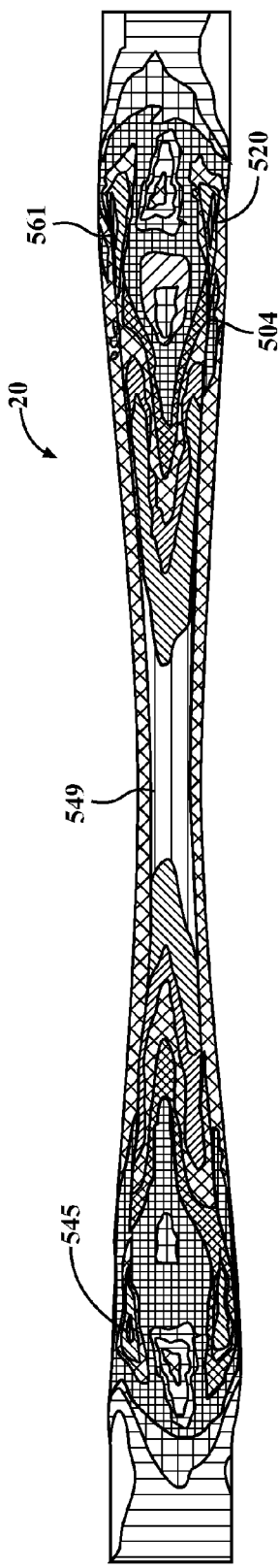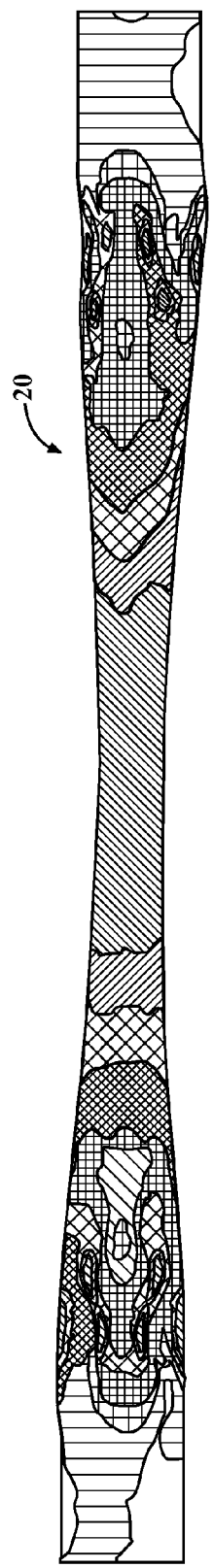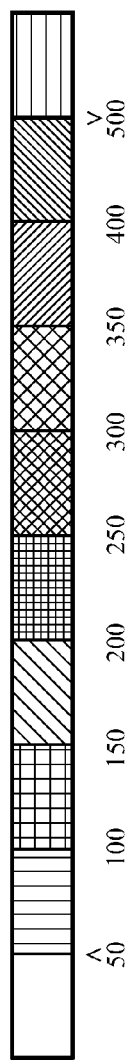
FIG. 6
FIG. 7

LIGHT WEIGHT TUBULAR TWIST BEAM

CROSS REFERENCE TO RELATED APPLICATIONS

This U.S. National Stage patent application claims priority to PCT International Application No. PCT/CA2013/000571 filed Jun. 13, 2013, entitled "Light Weight Tubular Twist Beam" which claims the benefit of U.S. Provisional Patent Application Ser. No. 61/660,151, entitled "Light Weight Tubular Twist Beam Part", filed Jun. 15, 2012, the entire disclosures of the applications being considered part of the disclosure of this application, and hereby incorporated by reference.

BACKGROUND OF THE INVENTION

1. Field of the Invention

The subject invention relates to twist beams for automotive vehicles, and more particularly to tubular twist beams, and methods of forming tubular twist beams.

2. Related Art

Automotive vehicles include torsion beams to connect the two rear wheels together through the use of longitudinal control arms. A particular type of torsion beam used on rear suspensions is a twist beam. Twist beams oftentimes comprise a tubular part having an O-shaped, C-shaped, U-shaped, or V-shaped cross-section, which is rigid enough to prevent bending and flexible enough to allow torsion. Accordingly, the tubular twist beam is not only a structural member, but also acts as a torsion spring. An example of a tubular twist beam is disclosed in U.S. Patent Application Publication No. 2010/0301577.

The weight of the tubular twist beam is preferably low because it contributes to the total weight of the automotive vehicle. However, tubular twist beams experience a significant amount of stress due to twisting and other factors. Therefore, maximum stress levels, especially those due to twisting, require a minimum material thickness and thus dictate the weight of the tubular twist beam.

The tubular twist beam is also used to control a roll rate of the vehicle, which affects the ride and handling of the vehicle. The roll rate is analogous to a vehicle's ride rate, but for actions that include lateral accelerations, causing a vehicle's sprung mass to roll. Roll rate is expressed as torque per degree of roll of the vehicle sprung mass, and is typically measured in Nm/degree. The roll rate of a vehicle does not change the total amount of weight transfer on the vehicle, but shifts the speed at which and percentage of weight transferred on a particular axle to another axle through the vehicle chassis. Generally, the higher the roll rate on an axle of a vehicle, the faster and higher percentage the weight transfer on that axle. A slower weight transfer reduces the likelihood of vehicle rollover conditions. The dimensions and design of the tubular twist beam have a significant influence on the roll rate of the vehicle.

SUMMARY OF THE INVENTION

The invention provides a tubular twist beam comprising a tubular body extending longitudinally along a center axis between opposite end sections. Each end section presents a cylindrical opening surrounding the center axis. The tubular body includes an upper wall and side walls. The side walls are disposed on opposite sides of the upper wall. The upper wall extends from each of the end sections inwardly and toward a center point, which is disposed equally between the opposite end sections, and downwardly toward the center axis to present transition sections. Each of the side walls includes depressions along the transition sections. The upper wall of the tubular body presents a U-shaped groove between the side walls. The U-shaped groove extends longitudinally along the center axis between the transition sections. The side walls of the tubular body present a width therebetween. The width of the tubular body decreases continuously along the center axis from each of the transition sections along the U-shaped groove to the center point.

The invention also provides a method of forming a tubular twist beam. The method comprises providing a tubular body extending longitudinally along a center axis between opposite end sections. The tubular body includes a center point disposed equally between the opposite end sections, and the end sections of the tubular body each present a cylindrical opening surrounding the center axis. The method next includes pressing an upper wall of the tubular body toward the center axis to form a U-shaped groove extending between side walls and longitudinally along the center axis between opposite end sections while maintaining the cylindrical opening at the end sections. The step of pressing the upper wall toward the center axis includes forming transition sections between the end sections and the U-shaped groove. In the transition sections, the upper wall extends inwardly toward the center axis and the center point. The method further includes pressing the side walls of each transition section inwardly to form depressions; and pressing the side walls of the tubular body inwardly along the U-shaped groove such that the width of the U-shaped groove decreases continuously along the center axis from each of the transition sections to the center point.

The continuously decreasing width of the tubular body along the U-shaped groove shifts stress from the transition sections to an area around the center point. Further, the depressions direct stress to a lower wall, also referred to as the underside of the U-shaped groove. The design of the tubular body balances stress levels along the length of the tubular body, and the overall stress level is reduced. Thus, the tubular body can be formed with a reduced thickness and thus a reduced weight without exceeding maximum stress levels or sacrificing performance.

BRIEF DESCRIPTION OF THE DRAWING

Other advantages of the present invention will be readily appreciated, as the same becomes better understood by reference to the following detailed description when considered in connection with the accompanying drawing wherein:

FIG. 6 is another top view of the tubular body of FIG. 1 showing an approximate stress level analysis;

FIG. 7 is another bottom view of the tubular body of FIG. 1 showing an approximate stress level analysis;

DETAILED DESCRIPTION

Figure 1:
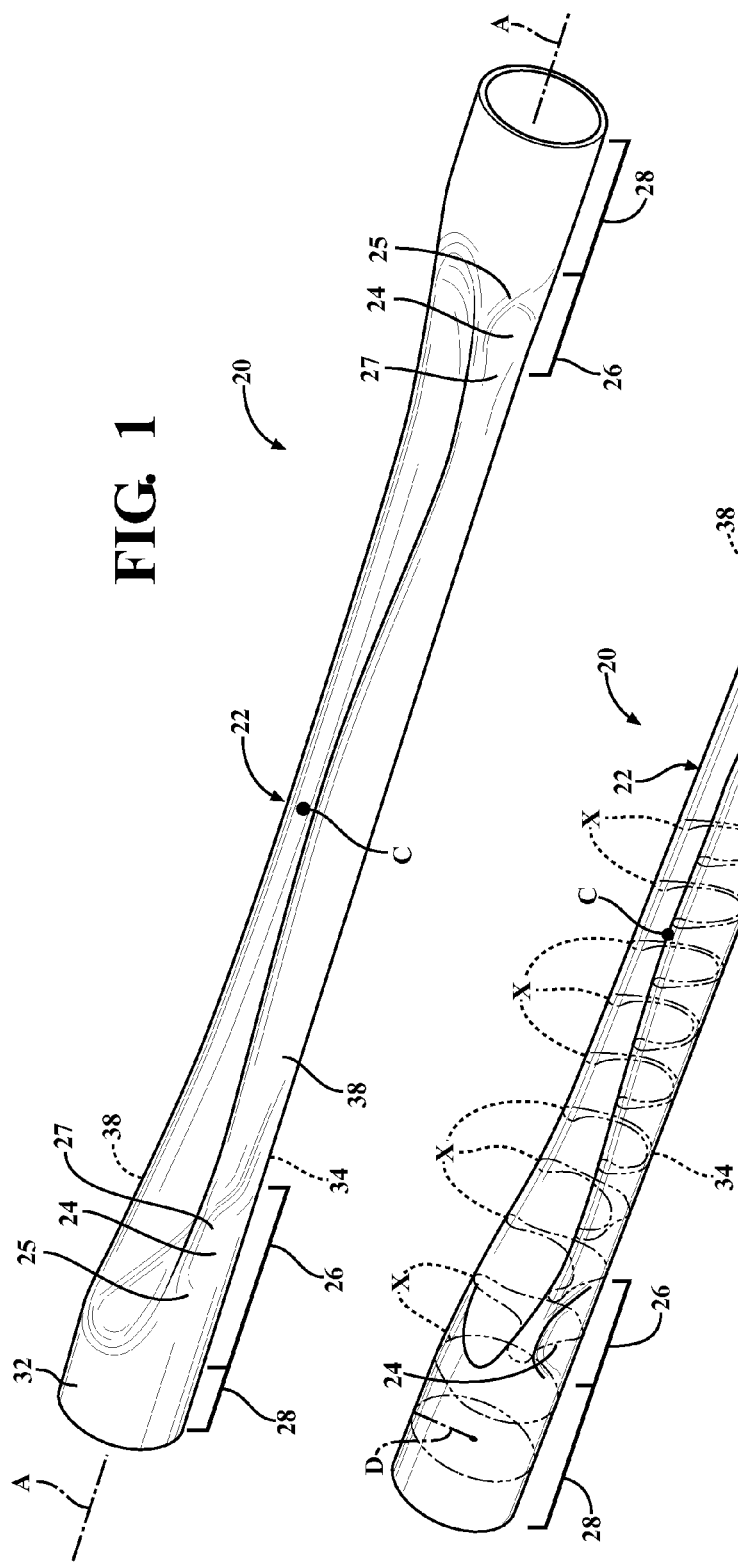
FIG. 1 is a perspective view of a tubular twist beam comprising a tubular body according to one embodiment of the invention.

Referring to the Figures, a tubular twist beam comprising a tubular body 20 is general shown. The tubular body 20 includes a U-shaped groove 22, a pair of tubular end sections 28, and transition sections 26 between the tubular end sections 28 and the U-shaped groove 22. The width w of the U-shaped groove 22 decreases continuously from the transition sections 26 to a center point C of the tubular body 20. The width w is narrowest at the center point C to shift stress away from the transition sections 26. The width w of the U-shaped groove 22 can be adjusted to achieve the desired roll rate. Further, depressions 24, i.e. dents, are formed along side walls 38 of each transition section 26 to direct stress to a lower wall 34, also referred to as the underside of the U-shaped groove 22. The continuously changing width w of the U-shaped groove 22 and the depressions 24 balance the stress throughout the tubular body 20 and reduce the overall stress level. Thus, the tubular body 20 can be formed of less material and the total weight of the tubular body 20 may be reduced. FIGS. 1-7 show perspective, side, top, and bottom views of the tubular body 20 according to one exemplary embodiment.

The tubular body 20 is formed from a metal tube extending around and longitudinally along a center axis A. The tube can comprise a variety of different dimensions, but the exemplary tubular body 20 shown in FIGS. 1-7 is formed form a tube having a diameter of 90 mm, a length of 930 mm, and a thickness of 2.8 mm. The tubular body 20 extends longitudinally along the center axis A between the opposite end sections 28. The center point C is disposed equally between the end sections 28, as shown in FIGS. 1-5. The geometry of the tubular body 20 is described by referring to the side walls 38, the lower wall 34, and an upper wall 32 facing opposite the lower wall 34. The side walls 38, upper wall 32, and lower wall 34 are integral with one another and surround the center axis A. The side walls 38 space the upper wall 32 and the lower wall 34 from one another and are disposed on opposite sides of the upper wall 32 and lower wall 34.

Figure 2:
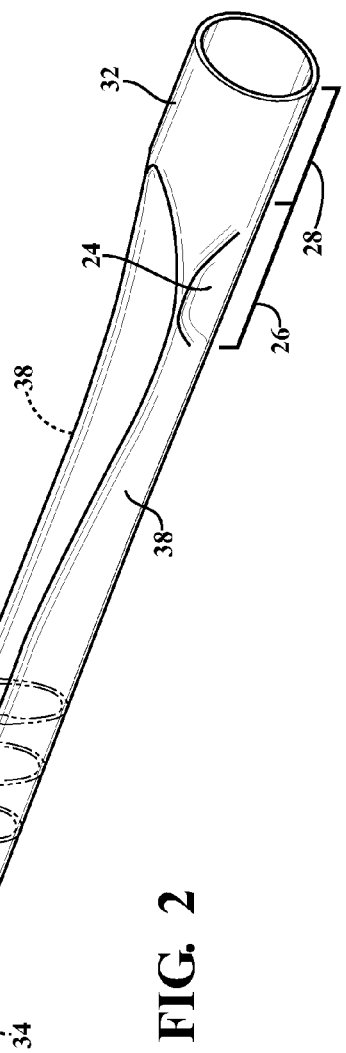
FIG. 2 is another perspective view of the tubular body of FIG. 1 showing the cross-sectional area of an opening.
Figure 2A:
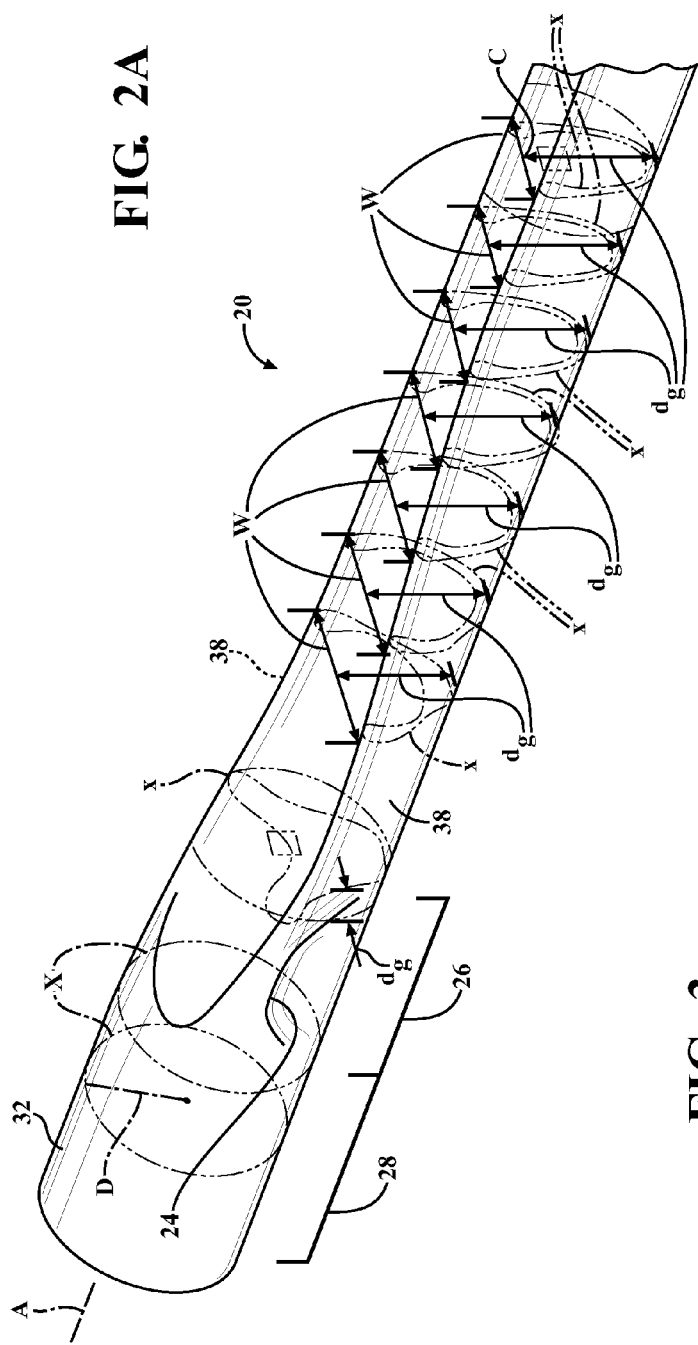
FIG. 2A is an enlarged view of a portion of FIG. 2 showing the depth of a depression.

The ends of the metal tube used to form the tubular body 20 remain unchanged to present the tubular end sections 28. The tubular end sections 28 each present a cylindrical-shaped opening surrounding the center axis A and a diameter D extending across the center axis A, as shown in FIGS. 2 and 2A. The cylindrical-shaped opening of the end sections 28 presents a circular-shaped cross-section. The cylindrical-shaped opening extends longitudinally along a portion of the center axis A and then transitions to a U-shaped opening along the U-shaped groove 22. The opening has a cross-sectional area X and dimensions which are constant along the end sections 28 but vary continuously along the remaining sections of the tubular body 20, as shown in FIGS. 2 and 2A.

The U-shaped groove 22 and transition sections 26 are formed by pressing, pinching, or otherwise deforming the metal tube. The upper wall 32 of the tubular body 20 is typically pressed inward and downward toward the center axis A, and the side walls 38 of the tubular body 20 are pressed or pinched inwardly toward one another and the center axis A. The extent of pressing or pinching of the tubular body 20 depends on the desired roll rate. The lower wall 34, however, typically maintains a convex contour along the length of the tubular body 20.

The transition sections 26 are formed between each end section 28 and the U-shaped groove 22 and connect the end sections 28 to the U-shaped groove 22. The opposite transition sections 26 are defined by the upper wall 32 caving or collapsing inward. The upper wall 32 extending inwardly and downwardly from each of the end sections 28 toward the center axis A and toward the center point C. In the transition sections 26, the upper wall 32 has a concave contour extending longitudinally along the center axis A to the U-shaped groove 22. The upper wall 32 of the transitions sections 26 also slopes inwardly from each side wall 38 toward the center axis A. Accordingly, the configuration of each transition section 26 can be referred to as trough-shaped.

Figure 3:
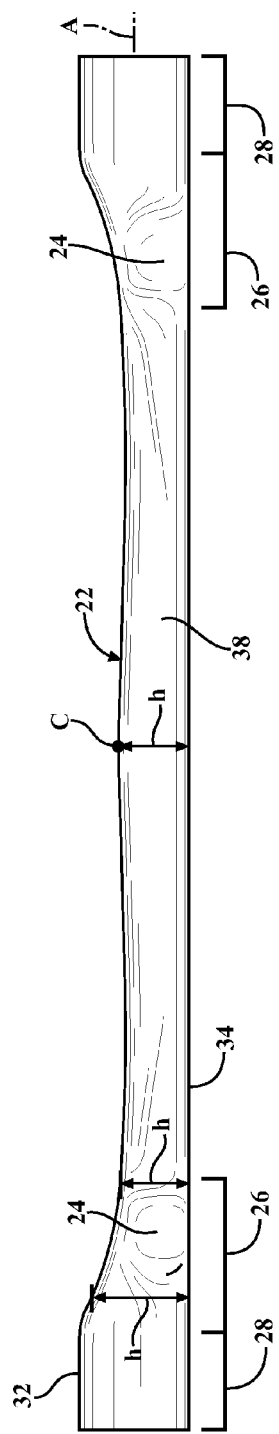
FIG. 3 is a side view of the tubular body of FIG. 1.
Figure 4:
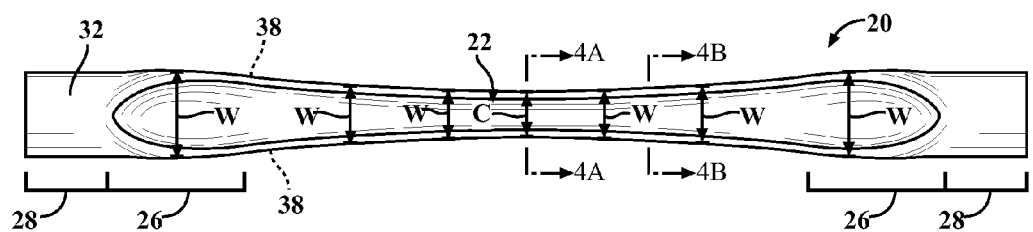
FIG. 4 is a top view of the tubular body of FIG. 1.

The transition sections 26 also have a height h decreasing continuously along the center axis A from the tubular end sections 28 to the U-shaped groove 22, as shown in FIG. 3. The height h of the tubular body 20 extends from the upper wall 32 to the lower wall 34, and is equal to the distance between vertically aligned points along the upper wall 32 and the lower wall 34. The width w of the transition sections 26 decreases continuously along the center axis A from the tubular end sections 28 to the U-shaped groove 22, as best shown in FIGS. 2A and 4. The width w is measured from the outermost horizontally aligned points of the side walls 38 and is equal to the distance between those points. The cross-sectional area X of the opening also decreases continuously along the transition sections 26, as best shown in FIGS. 2 and 2A.

The depressions 24 are formed in each of the side walls 38 along each of the transition sections 26 to direct stress to the lower wall 34 or underside of the U-shaped groove 22. The depressions 24 of each transition section 26 are longitudinally aligned with one another on the opposing side walls 38. Each depression 24 extends from an outside edge 25 to an inside edge 27 and has a concave contour between the edges 25, 27, as shown in FIG. 1. The depressions 24 are formed by pressing, pinching, or otherwise deforming the side walls 38 of the tubular body 20 such that the side walls collapse or cave inward. Each depression 24 has a depth $d_d$ extending inwardly toward the center axis A, as shown in FIG. 2A. In the exemplary embodiment, the depressions 24 each have a depth $d_d$ of 17.18 mm. The location of each transition section 26 along the center axis A can be partially defined by the inner edge 27 of each depression 24. The transition section 26 begins where the upper wall 32 begins to cave inwardly, and the transition section 26 ends at the inner edge 27 of the depression 24. The upper wall 32 continues to cave or collapse inward and extend downwardly toward the lower wall 34 along the transition sections 26. Eventually, the upper wall 32 extends below the center axis A and presents the U-shaped groove 22.

The U-shaped groove 22 presented by the upper wall 32 of the tubular body 20 is disposed the between the side walls 38. The U-shaped groove 22 is also referred to as a torsion section, and the dimensions of the U-shaped groove 22 are designed to achieve the desired roll rate. The U-shaped groove 22 extends continuously between the opposite transition sections 26, which typically end at the inner edge 27 of each depression 24. Each U-shaped groove 22 extends longitudinally along the center axis A between the depressions 24 of the transition sections 26 and the center point C. The side walls 38 of the U-shaped groove 22 also present the width w extending therebetween, and the width w decreases continuously along the center axis A from the inner edge 27 of each depression 24 along the length of the U-shaped groove 22 to the center point C, as shown in FIGS. 2A and 4. The side walls 38 of the tubular body 20 are not parallel to one another at any point along the U-shaped groove 22 between each transition section 26 and the center point C.

Figures 4A, 4B:
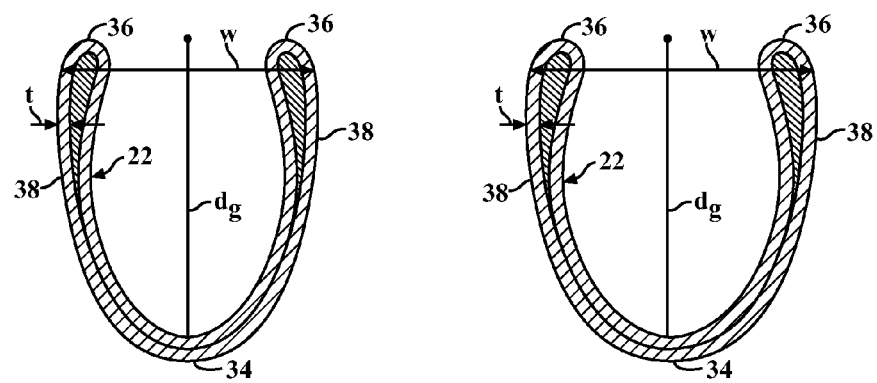
FIG. 4A is an enlarged cross-sectional view of the tubular body of FIG. 4 along line 4A-4A.
FIG. 4B is an enlarged cross-sectional view of the tubular body of FIG. 4 along line 4B-4B.
Figure 5:
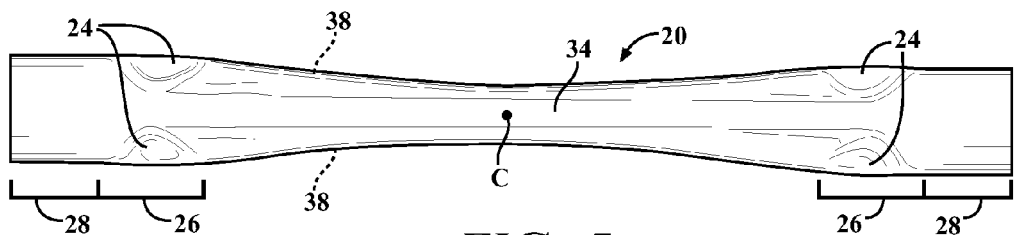
FIG. 5 is a bottom view of the tubular body of FIG. 1.

The U-shaped groove 22 also presents a depth $d_g$ extending from a point aligned with the top of the upper wall 32, between the side walls 38, to the lower wall 34, as shown in FIGS. 2A, 4A, and 4B. The depth $d_g$ of the U-shaped groove 22 increases continuously from each of the transition sections 26 to the center point C. The cross-sectional area X of the opening also continues to decrease along the U-shaped groove 22 toward the center point C, and the cross-sectional area X of the opening is smallest at the center point C. In one embodiment, the walls 32, 34, and 38 come together at the center point C so that the opening is completely closed at the center point C. As shown in FIG. 3, the height h of the tubular body 20 increases slightly along a portion of the U-shaped groove 22, around and at the center point C. The upper wall 32 of the tubular body 20 also presents a bulge 36 between the side wall 38 and the U-shaped groove 22, as best shown in FIGS. 4A and 4B. The transition sections 26 may also include the bulge 36.

Each wall 32, 34, 38 of the tubular body 20 presents a thickness t, and the thickness t of each wall 32, 34, 38 is typically equal to the thickness t of the other walls 32, 34, 38, as shown in FIGS. 4A and 4B. For example, the tubular body 20 can have a thickness t of 2.8 mm, 3.2 mm, or 3.6 mm. However, the thickness t of the tubular body 20 can be increased or decreased, depending on the forming process, desired roll rate, or other factors. The thickness t along the length of the tubular body 20 is typically constant, but may vary slightly. The thickness t of the tubular body 20 around the center axis A is also typically constant, but may vary around the center axis A.

Figure 8:
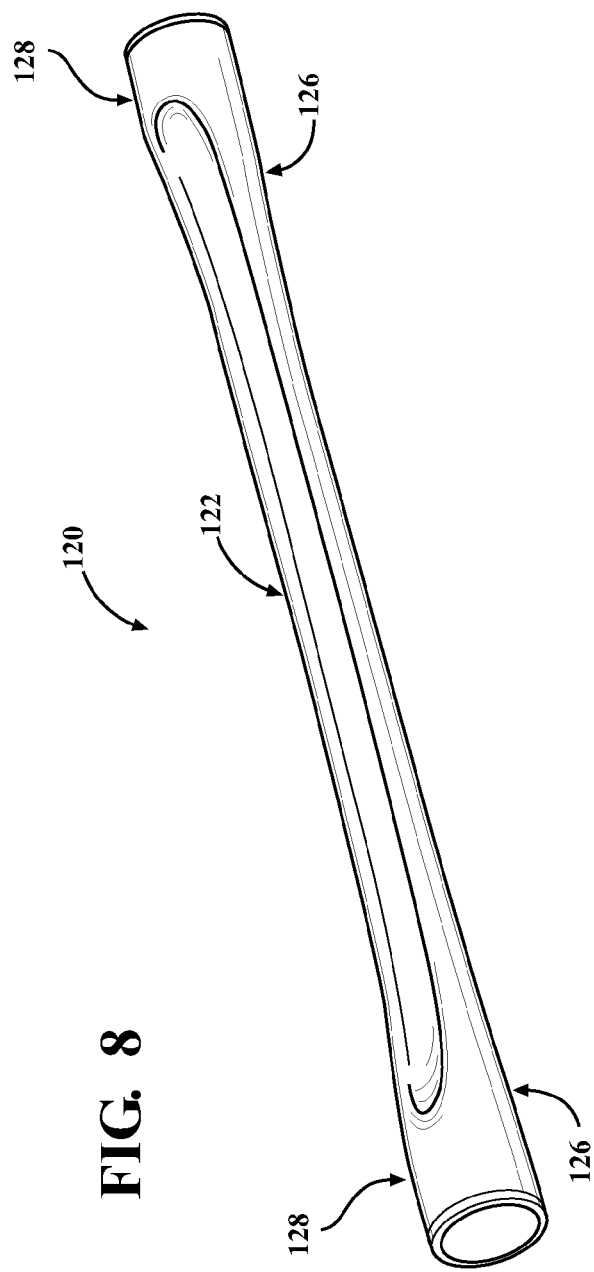
FIG. 8 is a perspective view of a comparative tubular twist beam.
Figure 9:
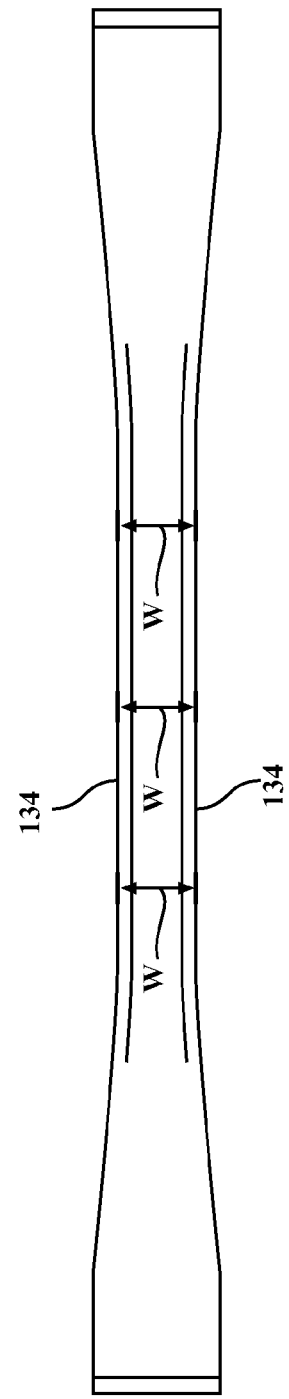
FIG. 9 is a side view of the comparative tubular twist beam of FIG. 8.

The tubular twist beam comprising the tubular body 20 of the present invention provides several advantages over comparative twist beams. An example of a comparative twist beam is shown at 120 in FIGS. 8 and 9. The comparative twist beam 120 also has tubular end sections 128, a U-shaped groove 122, and transition sections 126. However, in the comparative twist beam 120, the U-shaped groove 122 has a constant width w and side walls 134 are parallel to one another along a significant portion of the U-shaped groove 122.

The twist beam comprising the tubular body 20 of the present invention experiences less stress in the transition sections 26 than the comparative part 120 because the width w of the U-shaped groove 22 continuously decreases from the transition section 26 to the center point C and is narrowest at the center point C. Therefore, the twist strain is directed away from the transition sections 26 and the total peak stress level in the transition sections 26 is reduced. The depressions 24 also reduce the total peak stress level in the transition sections 26 by directing the stress to the underside of the tubular body 20.

FIG. 6 is a top view and FIG. 7 is a bottom view showing the approximate stress levels along the exemplary tubular body 20, in MPa/Mises, when the tubular body 20 is used in a vehicle having a roll rate of 404 Nm/degree. A legend for the approximate stress levels is also provided in the Figures. The stress levels along the length of the tubular body 20 are more balanced than those of the comparative twist beam 122 and other tubular twist beams of the prior art. Further, test results indicate that the thickness of the tubular body 20 can be lower than the thickness of the comparative twist beam 122, without increasing the total stress levels. Accordingly, the twist beam comprising the tubular body 20 of the present invention can have a reduced weight and thus provide significant costs savings without exceeding maximum stress levels or sacrificing performance. Furthermore, the roll rate provided by the tubular body 20 can be adjusted by adjusting the width w of the U-shaped groove or thickness t of the tubular body along the U-shaped groove 22. For example, the roll rate can be decreased by decreasing the thickness t or decreasing the width w of the U-shaped groove 22.

The invention also provides a method of forming the tubular twist beam comprising the tubular body 20. The method first includes providing the tubular body 20 extending longitudinally along the center axis A between the opposite end sections 28. Before pressing the upper wall 32 and side walls 38 inward, the tubular body 20 has a thickness of 2.8 mm, a length of 930 mm, and a diameter of 90 mm.

The method next includes pressing the upper wall 32 of the tubular body 20 toward the center axis A to form the U-shaped groove 22, while maintaining the cylindrical opening at the opposite end sections 28. The step of pressing the upper wall 32 toward the center axis A also includes forming transition sections 26 between the end sections 28 and the U-shaped groove 22.

The method also includes pressing the side walls 38 of the tubular body 20 inwardly along the U-shaped groove 22 such that the width w of the U-shaped groove 22 decreases continuously along the center axis A. The step of pressing the upper wall 32 typically includes increasing the depth $d_g$ of the U-shaped groove 22 continuously from each of the transition sections 26 to the center point C. The method further includes pressing a portion of the side walls 38 of each transition section 26 inwardly to form the depressions 24.

Obviously, many modifications and variations of the present invention are possible in light of the above teachings and may be practiced otherwise than as specifically described while being within the scope of the claims.

What is claimed is:

1. A tubular twist beam, comprising:
a tubular body extending longitudinally along a center axis between opposite end sections, said tubular body including a center point disposed equally between said opposite end sections, and said end sections presenting a cylindrical opening surrounding said center axis;
said tubular body including an upper wall and side walls disposed on opposite sides of said upper wall, said upper wall extending from each of said end sections inwardly toward said center point and downwardly toward said center axis to present transition sections, and each of said side walls including a depression along each of said transition sections;
said upper wall of said tubular body presenting a U-shaped groove between said side walls and extending longitudinally along said center axis between said transition sections; and
said side walls of said tubular body presenting a width extending therebetween, and said width decreasing continuously along said center axis from each of said transition sections along said U-shaped groove to said center point.

2. The tubular twist beam of claim 1, wherein said U-shaped groove presents a depth, and said depth is greatest at said center point.

3. The tubular twist beam of claim 2, wherein said depth of said U-shaped groove increases continuously from each of said transition sections to said center point.

4. The tubular twist beam of claim 1, wherein said side walls are not parallel to one another at any point along said U-shaped groove between each of said transition sections and said center point.

5. The tubular twist beam of claim 1, wherein said depressions of said transition sections are concave.

6. The tubular twist beam of claim 1, wherein said tubular body presents an opening having a cross-sectional area and extending continuously between said opposite end sections, and wherein said cross-sectional area of said opening decreases along said center axis from said end sections to said center point.

7. The tubular twist beam of claim 6, wherein said cross-sectional area of said end sections is constant, and said cross-sectional area decreases continuously along said center axis from said end sections to said center point.

8. The tubular twist beam of claim 1, wherein said tubular body includes a lower wall facing opposite said upper wall, and said lower wall is convex.

9. The tubular twist beam of claim 8, wherein said tubular body presents a height extending from said lower wall to said upper wall, and said height decreases along said center axis from said end sections along said transition sections and to said U-shaped groove.

10. The tubular twist beam of claim 9, wherein said height of said tubular body increases along a portion of said U-shaped groove at said center point.

11. The tubular twist beam of claim 1, wherein said upper wall of said tubular body presents a bulge between said side walls and said U-shaped groove.

12. The tubular twist beam of claim 1, wherein said upper wall has a concave contour extending longitudinally along said center axis of each of said transition sections, and said upper wall of said transition sections slopes inwardly from said side walls toward said center axis.

13. The tubular twist beam of claim 1, wherein said width of said tubular body is narrowest at said center point.

14. The tubular twist beam of claim 1, wherein each depression is longitudinally aligned with another one of the depressions located on the opposite side wall.

15. The tubular twist beam of claim 1, wherein said width of said tubular body is narrowest at said center point;
said U-shaped groove presents a depth, and said depth of said U-shaped groove increases continuously from each of said transition sections to said center point;
each depression is longitudinally aligned with another one of the depressions located on the opposite side wall;
said depressions of said transition sections are concave;
said tubular body presents an opening having a cross-sectional area and extending continuously between said opposite end sections, said cross-sectional area of said end sections is constant, and said cross-sectional area decreases continuously along said center axis from said end sections to said center point;
said tubular body includes a lower wall facing opposite said upper wall, and said lower wall is convex;
said tubular body presents a height extending from said lower wall to said upper wall, said height decreases along said center axis from said end sections along said transition sections and to said U-shaped groove, and said height of said tubular body increases along a portion of said U-shaped groove at said center point;
said upper wall of said tubular body presents a bulge between said side walls and said U-shaped groove;
said upper wall has a concave contour extending longitudinally along said center axis of each of said transition sections; and
said upper wall of said transition sections slopes inwardly from said side walls toward said center axis.

16. The tubular twist beam of claim 1, wherein the tubular body has a length of 930 mm and a thickness ranging from 2.8 mm to 3.6 mm, the end sections of the tubular body have a diameter of 90 mm, and the depressions have a depth of 17.18 mm.

17. A method of forming a tubular twist beam, comprising the steps of:
providing a tubular body extending longitudinally along a center axis between opposite end sections, the tubular body including a center point disposed equally between the end sections, and the end sections of the tubular body each presenting a cylindrical opening surrounding the center axis;
pressing an upper wall of the tubular body toward the center axis to form a U-shaped groove extending between side walls and longitudinally along the center axis between opposite end sections while maintaining the cylindrical opening at the end sections;
the step of pressing the upper wall toward the center axis including forming transition sections between the end sections and the U-shaped groove, wherein the upper wall extends inwardly toward the center axis and the center point;
pressing the side walls of each transition section inwardly to form depressions; and
pressing the side walls of the tubular body inwardly along the U-shaped groove such that a width presented between the sidewalls decreases continuously along the center axis from each of the transition sections to the center point.

18. The method of claim 17, wherein step of pressing the upper wall includes increasing a depth of the U-shaped groove continuously from each of the transition sections to the center point.

19. The method of claim 17, wherein the tubular body presents an opening having a cross-sectional area and extending continuously between the opposite end sections, and wherein the step of pressing the side walls of the tubular body inwardly includes decreasing the cross-sectional area of the opening continuously along the center axis from the end sections to the center point.

20. The method of claim 17, wherein before the pressing steps, the tubular body has a thickness of 2.8 mm, a length of 930 mm, and a diameter of 90 mm; and after the pressing steps the depressions have a depth of 17.18 mm.

* * * * *